(12) United States Patent
Fabbris et al.

(10) Patent No.: US 8,728,230 B2
(45) Date of Patent: *May 20, 2014

(54) TEMPERATURE-STABLE LIQUID AQUEOUS POLYSACCHARIDE SUSPENSIONS AND USE THEREOF AS THICKENING AGENTS IN CEMENTITIOUS COMPOSITIONS

(71) Applicants: C.T.G. (Centre Technique du Groupe ITALCEMENTI), Guerville (FR); Ciments Francais, Puteaux (FR)

(72) Inventors: Faber Fabbris, Paris (FR); Soraya Mehalebi, Poissy (FR)

(73) Assignee: Ciments Francais, Puteaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/683,238

(22) Filed: Nov. 21, 2012

(65) Prior Publication Data
US 2013/0074739 A1  Mar. 28, 2013

Related U.S. Application Data

(63) Continuation of application No. 13/634,628, filed as application No. PCT/FR2011/050404 on Feb. 28, 2011, now abandoned.

(30) Foreign Application Priority Data

Mar. 15, 2010 (FR) ...................................... 10 51812

(51) Int. Cl.
*C04B 26/28* (2006.01)

(52) U.S. Cl.
USPC .......................................... 106/718; 106/729

(58) Field of Classification Search
USPC .................................................. 106/718, 729
See application file for complete search history.

(56) References Cited

U.S. PATENT DOCUMENTS

| 4,283,229 A | 8/1981 | Girg et al. |
| 5,028,263 A | 7/1991 | Burdick |
| 2013/0081558 A1* | 4/2013 | Fabbris .......................... 106/804 |

FOREIGN PATENT DOCUMENTS

| EP | 1 614 669 | 1/2006 |
| WO | 02094734 | 11/2002 |

OTHER PUBLICATIONS

International Search Report dated May 12, 2011, corresponding to PCT/FR2011/050404.

* cited by examiner

*Primary Examiner* — Paul Marcantoni
(74) *Attorney, Agent, or Firm* — Young & Thompson

(57) ABSTRACT

A liquid aqueous suspension of polysaccharide, contains a mass concentration of at least one polysaccharide of between 15 and 35% in the form of partially hydrated particles dispersed in an aqueous solution of a strong base salt, excluding ammonium salts, with an ionic strength of between 1.25 mol/L and 15 mol/L, has a pH greater than 9 and contains at least one non-phyllitic crystalline mineral powder, referred to hereafter as filler, which is chemically inert in the aqueous suspension and which has a grain size of between 0.1 and 100 micrometers and an attapulgite in micronized form, the aqueous suspension being stable at least in a temperature range from 5 to 30° C. The suspension is suitable for use as an agent for thickening cementitious compositions.

10 Claims, No Drawings

TEMPERATURE-STABLE LIQUID AQUEOUS POLYSACCHARIDE SUSPENSIONS AND USE THEREOF AS THICKENING AGENTS IN CEMENTITIOUS COMPOSITIONS

CROSS REFERENCE TO RELATED APPLICATIONS

This application is a continuation of copending application Ser. No. 13/634,628 filed on Sep. 13, 2012; which is the 35 U.S.C. 371 national stage of International application PCT/FR11/50404 filed on Feb. 28, 2011; which claims priority to French application 1051812 filed on Mar. 15, 2010. The entire contents of each of the above-identified applications are hereby incorporated by reference.

FIELD OF THE INVENTION

The present invention relates to stable liquid aqueous polysaccharide suspensions and to their use in cementitious compositions, and to the cementitious compositions comprising them.

BACKGROUND OF THE INVENTION

Polysaccharides, such as cellulose derivatives, such as, for example, hydroxyethylcellulose, are used in numerous fields for increasing the viscosity of compositions. This is the case in particular for cements, mortars and concretes.

However, to date, these polysaccharides are added to the cementitious compositions in the solid (powder) form at the time of the mixing with water or before the mixing.

DESCRIPTION OF THE RELATED ART

The use of adjuvants in the solid form can present processing difficulties, in particular during their storage, their metering or their dispersion in homogeneous fashion in the medium to which they are added, more particularly on worksites. Investigations were consequently carried out on introducing these polysaccharides in the liquid form.

If polysaccharides are soluble at a low concentration in water, when it is desired to increase their concentration above 5% by weight, for example, their solubility is not complete and very often compositions having a very high viscosity are obtained, indeed even pasty compositions or gels, which it is subsequently very difficult to use: decanting and pumping then being very difficult or impossible.

If, on the other hand, polysaccharides are dispersed in a liquid medium in which they are not soluble, they bring about liquid suspensions which are generally unstable due to the difference in density between the particles and the liquid medium. These suspensions may exhibit, over time, a separation by settling or a creaming phenomenon, resulting in a deposition on the walls of the container in which they are present. In some cases, these suspensions exhibit one of the two phenomena as the result of a variation in temperature. In other cases, they may exhibit one or other of the two phenomena (separation by settling or creaming) according to the temperature of exposure.

Furthermore, U.S. Pat. No. 5,028,263 of Aqualon describes aqueous suspensions of anionic or nonionic polymers, such as cellulose ethers, dispersed in aqueous solutions having a high content of ammonium salt. In point of fact, such salts are not compatible with use in a cementitious medium as they react with $Ca(OH)_2$ and accelerate the degradation of the concrete.

U.S. Pat. No. 4,283,229 describes cellulose ether suspensions including very finely divided alumina. In point of fact, very finely divided alumina accelerates the setting times of the cement, which may be damaging, for example, to the preparation of self-leveling screeds, for which it is necessary to maintain the rheology over time.

Furthermore, none of these documents refers to a temperature stability of the aqueous suspensions employed.

The aim of the present invention is to overcome the above disadvantages by providing a stable liquid aqueous suspension of polysaccharide(s) which can be used in cementitious compositions.

This is because it has been discovered, surprisingly, that the suspending of polysaccharide in an aqueous solution of a certain ionic strength in the presence of a clay of attapulgite type and of a micronized mineral powder makes it possible to stabilize said polysaccharide suspension at least within a certain temperature range.

To this end, the liquid aqueous polysaccharide suspension according to the invention includes a concentration by weight of at least one polysaccharide of between 15 and 35% in the form of partially hydrated particles dispersed in an aqueous solution of a strong base salt, with the exception of ammonium salts, having an ionic strength of between 1.25 mol/l and 15 mol/l, exhibiting a pH of greater than 9, and includes attapulgite in the micronized form and at least one nonphyllitic mineral powder, hereinafter referred to as filler, chemically inert in said aqueous suspension, with a particle size of between 0.1 and 100 micrometers, conferring on said aqueous suspension a stability at least in a temperature range extending from 5 to 30° C.

Thus, a high concentration by weight of polysaccharide makes it possible to use this aqueous suspension in numerous situations and makes it possible to introduce a high proportion of polysaccharide without increasing the content of adjuvant (which must not exceed 5% of the weight of the cement). In addition, this stability over a temperature range extending from at least 5° C. to 30° C. allows them to be stored, transported and employed in cementitious compositions in the majority of uses, in particular on worksites.

The content by weight of attapulgite in the aqueous suspension is advantageously between 0.1% and 5%, preferably between 0.2% and 0.8%.

Among the clays tested, attapulgite (or polygorskite) is a phyllosilicate which makes it possible, surprisingly, to stabilize the suspension of polysaccharides according to the invention with regard to variations in temperature (in particular between 5 and 30° C.).

The comparative examples described below in the description show that other clays, such as bentonite or kaolinite, at the same concentrations, are not at all effective.

Advantageously, the filler is a siliceous filler, preferably a crystalline filler, with a density of between 2.60 and 2.80 g/ml. It can, for example, be micronized silica.

Preferably, this filler exhibits a particle size curve for which the D50 value is between 1 and 12 micrometers, preferably between 2 and 8 micrometers.

Its content by weight is advantageously between 0.1 and 5%, preferably between 0.35 and 1.5%, of said aqueous suspension.

The preferred concentration by weight of polysaccharide(s) is between 18 and 25% of said aqueous suspension.

The aqueous suspension is produced by the preparation first of all of the aqueous solution having an ionic strength of between 1.25 mol/l and 15 mol/l, preferably of between 2.5 mol/l and 12.5 mol/l and advantageously between 5 and 10 mol/l.

The strong base salt used to prepare this aqueous solution can, for example, be $K_2CO_3$, $K_3PO_4$, $Na_2CO_3$ or $NaH_2PO_4$. The presence of halides and of sulfates is also avoided in this solution, if it is desired to employ said suspension in the cement field.

The polysaccharide is provided in the form of a dry powder and its dry particle size curve exhibits a D50 value of between 10 and 200 μm, preferably between 50 and 150 μm.

Advantageously, the polysaccharide is chosen from a hydroxyalkylcellulose or a hydroxyalkyl guar comprising a $C_2$ to $C_8$ alkyl group, a diutan gum or a mixture of these.

The hydroxyalkylcellulose can be chosen from a hydroxyethylcellulose (HEC), a methylhydroxypropyl cellulose (MHPC), a hydrophobic modified hydroxyethylcellulose (HMHEC) or a mixture of these.

In the cement field, it has turned out that the aqueous suspension according to the invention is entirely appropriate as viscosifying agent and it has been found, surprisingly, that the latter does not reduce the spreading of the cementitious compositions in which it is incorporated, in particular in the case where the polysaccharide used is a hydroxyalkylcellulose.

SUMMARY OF THE INVENTION

The present invention thus relates to the use of the above-mentioned liquid aqueous suspension as viscosifying agent for increasing the viscosity of cementitious compositions, more particularly in the case where the polysaccharide used is a hydroxyalkylcellulose, without affecting the spreading thereof.

Thus, the present invention also relates to a cementitious composition based on cement and water, characterized in that it includes, as viscosifying agent, a liquid aqueous suspension as mentioned above in a content of between 0.1 and 5% approximately by weight of cement, preferably between 0.1 and 2% by weight of cement.

DETAILED DESCRIPTION OF THE INVENTION

The present invention will be illustrated with the help of the following nonlimiting examples:

EXAMPLES

Example 1

Comparative

An aqueous potassium carbonate ($K_2CO_3$) solution is prepared according to a concentration by weight of 32 g of $K_2CO_3$ in 100 g of water. The ionic strength of this solution is approximately 7 mol/l.

If a polysaccharide, such as hydroxyethylcellulose, is introduced into this solution, according to fractions of weight of between 18 and 22% by weight, it is found that the particles do not dissolve and that this suspension exhibits a phase separation in the form of a creaming visible after storing for 12 h. This creaming corresponds to approximately $\frac{1}{10}^{th}$ of the height of the suspension.

The density of the solution is in this instance 1.2296 g/ml at 20° C. In order to prevent this tendency toward the creaming phenomenon, it may be possible either to reduce the density of the aqueous phase ($K_2CO_3$ solution) or to increase the density of the suspension (HEC particles).

The first solution is difficult to carry out; it was therefore envisaged to alter the density of the suspended particles by charging them with a solid substance which may, for example, remain integral with the suspended hydrated hydroxyethylcellulose particles.

It turns out that, in the present case, the dry HEC particles exhibit a D50 of 85 micrometers. Siliceous fillers have been envisaged with a view to their chemical stability with regard to the $K_2CO_3$ solution. Various fillers of different particle sizes were tested, these siliceous fillers exhibiting a density of between 2.6 and 2.7. These fillers are presented in table 1 below.

TABLE 1

Particle sizes of the fillers selected

|  | >5 μm | D50 | D10 | D90 |
|---|---|---|---|---|
| Siliceous filler A | 77% | 11 μm | 32 μm | 3 μm |
| Siliceous filler B | 57.4% | 5.8 μm | 13.7 μm | 2.21 μm |
| Siliceous filler C | 33.8% | 3.6 μm | 9.9 μm | 1.54 μm |
| Siliceous filler D | 13.7% | 2.4 μm | 5.7 μm | 1.0 μm |

The effects of these various fillers on the reference suspension are presented in table 2 below.

The fillers were added with stirring to the $K_2CO_3$ solution before adding the hydroxyethylcellulose polysaccharide. After standing for 12 hours, it is observed (see table 2) that the suspensions including the fillers B, C and D exhibit a low creaming, the fraction of the height of which is less than $\frac{1}{20}$, lower than the reference suspension and the suspension with the filler A.

The filler B was thus selected for the continuation, it being considered that fillers having a finer particle size and thus a greater level of grinding (that is to say, having a higher cost) do not exhibit significant advantages.

Use was made, for these samples and for the tests of the examples below, of the appliance referred to as Turbiscan®. The Turbiscan® is a device, the operation of which is based on the scattering of light. A laser beam surrounds a sample inside a test tube. Depending on the size, the concentration and the surface condition of the particles, a fraction of light is transmitted in the same direction of incidence and a fraction is backscattered in different directions. Two sensors measure the intensity of the transmitted signal (angle of deflection 0°) and of the backscattered signal (angle of deflection equal to 135°). The light source travels over the entire height of the sample, thus demonstrating possible differences in composition and in particular a separation of phases (sudden variations in the signals of light transmitted or backscattered as a function of the height). The intensity fractions transmitted and backscattered can then be represented as a function of the height of the sample. The heights of each of the phases are deduced from these graphs, making it possible to quantify the separation of phases.

In the examples below, the stability at 12 h expresses the rounded value and the Turbiscan® 12 hours measurement expresses the more precise value in % of the fraction of the height of the separated phase: a positive fraction represents a creaming phenomenon and a negative fraction represents a phenomenon of separation on settling.

TABLE 2

Comparison of the effect of various fillers on the reference formulation

|  | Without filler | Filler A | Filler B | Filler C | Filler D |
|---|---|---|---|---|---|
| $K_2CO_3$ | 32 g | 32 g | 32 g | 32 g | 32 g |
| Water | 100 g | 100 g | 100 g | 100 g | 100 g |
| HEC | 37.22 g | 37.22 g | 37.22 g | 37.22 g | 37.22 g |
| Stabilizing filler | — | 1.7 g | 1.7 g | 1.7 g | 1.7 g |
| Conc. Saline Sol. | 32 g/100 ml | 32 g/100 ml | 32 g/100 ml | 32 g/100 ml | 32 g/100 ml |
| HEC Weight Fract. | 22% | 22% | 22% | 22% | 22% |
| $\rho_{sol}$ at 20° C. | 1.2296 g/ml | 1.2296 g/ml | 1.2296 g/ml | 1.2296 g/ml | 1.2296 g/ml |
| Stability at 12 h | Creaming | Creaming | Creaming | Creaming | Creaming |
| Height fraction | <1/10 | <1/10 | <1/20 | <1/20 | <1/20 |
| Turbiscan 12 h measurement | 7.82% | 6.96% | 3.12% | 3.22% | 3.05% |

Example 2

Comparative

In order to ascertain if the variation in a dosage of filler makes it possible to sufficiently ballast the hydrated hydroxyethylcellulose particles, different concentrations were tested. They were between 1 and 2% by weight. The results are presented in table 3 below.

TABLE 3

Variation in the dosage of filler B (1%-2%)

|  | Without filler | 1% | 1.2% | 1.4% | 1.6% | 1.8% | 2% |
|---|---|---|---|---|---|---|---|
| $K_2CO_3$ | 32 g | 32 g | 32 g | 32 g | 32 g | 32 g | 32 g |
| Water | 100 g | 100 g | 100 g | 100 g | 100 g | 100 g | 100 g |
| HEC | 37.22 g | 37.22 g | 37.22 g | 37.22 g | 37.22 g | 37.22 g | 37.22 g |
| Stabilizing filler | — | 1.70 g | 2.059 g | 2.405 g | 2.75 g | 3.097 g | 3.46 g |
| Conc. Saline Sol. | 32 g/100 ml | 32 g/100 ml | 32 g/100 ml | 32 g/100 ml | 32 g/100 ml | 32 g/100 ml | 32 g/100 ml |
| HEC Weight Fract. | 22% | 22% | 22% | 22% | 22% | 22% | 22% |
| $\rho_{sol}$ at 20° C. | 1.2296 g/ml | 1.2296 g/ml | 1.2296 g/ml | 1.2296 g/ml | 1.2296 g/ml | 1.2296 g/ml | 1.2296 g/ml |
| Turbiscan 12 h measurement | 7.82% | 3.12% | <0.1% | 0.1% | -1.7% sos. | -2.69% sos. | -3.5% sos. | sos. = separation on settling

It is noticed that the concentrations of 1.2% and 1.4% exhibit, after 12 hours, a limited phenomenon of creaming. Above, concentrations of filler of greater than or equal to 1.6% promote separation on settling.

The temperature stability of the suspension comprising 1.2% by weight of filler was evaluated between 5 and 35° C. (see table 4). The protocol used to monitor this temperature stability is as follows:

An amount of approximately 500 ml of suspension is prepared and then divided into six samples which are exposed to different temperatures (respectively 5, 10, 15, 20, 25 and 35° C.) for 12 hours. These samples are subsequently subjected to a measurement of fraction of the light according to the Turbiscan® method (described in example 1 above).

After having brought the samples back to a temperature of 20° C., the stability measurements are repeated. Finally, the samples are subjected to stirring and are again subjected to a measurement at 20° C. in order to detect a possible irreversibility in the transformations which occurred with temperature.

After returning to 20° C., the samples with filler exposed beforehand to 5° C. and 10° C. exhibit significant creaming. For the sample at 25° C., an intermediate phase separation is observed. It is thus found that temperature variations affect the stability of these aqueous hydroxyethylcellulose suspensions with filler, which may exhibit disadvantages, in particular during the storage thereof.

TABLE 4

Temperature stability of the reference formulation with filler (1.2%)

|  | 5° C. | 10° C. | 15° C. | 20° C. | 25° C. | 35° C. |
|---|---|---|---|---|---|---|
| After 12 h | -1% (sos.) | <0.1% | -5.5% (sos.) | <0.1% | <0.1%* | <0.1% |
| After returning to 20° C. | 4.44% | 2% | <0.1% | — | <0.1%* | <0.1% |

*intermediate phase separation

Example 3

0.5% by weight of attapulgite (sold under the name Attagel 50—particles with a size of 0.1 µm and a density of 2.4) was thus introduced in a dry form into the reference formulation including 1.2% by weight of filler B. The composition of the suspension is presented in table 5.

The temperature stability tests were carried out and it turns out that these are entirely satisfactory, as is clear in table 6.

The stability of these suspensions is markedly improved by virtue of the presence of this filler and of attapulgite.

TABLE 5

Reference formulation with filler (1.2%) and attapulgite (0.5%)

| Component | Weight, g (%) |
|---|---|
| $K_2CO_3$ | 32 g |
| Water | 100 g |
| Hydroxyethylcellulose | 37.23 g (22%) |
| Filler B | 2.059 g (1.2%) |
| Attapulgite | 0.865 g (0.5%) |
| Stability at 12 h | <0.1% |

TABLE 6

Temperature stability of the reference
formulation with 1.2% filler and 0.5% attapulgite

|  | 5° C. | 10° C. | 15° C. | 20° C. | 25° C. | 35° C. |
|---|---|---|---|---|---|---|
| Standing for 12 h | <0.1% | <0.1% | <0.1% | <0.1% | -0.5% | -1.2% |
| After returning to 20° C. | <0.1% | <0.1% | <0.1% | — | -0.2% | -0.9% |

Example 4

Different attapulgite concentrations were tested. These are presented in table 7 below.

TABLE 7

Reference formulation with filler (1.2%) and
attapulgite in variable amounts

| Component | Weight (g) | | | | |
|---|---|---|---|---|---|
| K$_2$CO$_3$ | 32 g | 32 g | 32 g | 32 g | 32 g |
| Water | 100 g | 100 g | 100 g | 100 g | 100 g |
| Hydroxyethylcellulose (22%) | 37.23 g | 37.23 g | 37.23 g | 37.23 g | 37.23 g |
| Filler B (1.2%) | 2.059 g | 2.059 g | 2.059 g | 2.059 g | 2.059 g |
| Attapulgite | — | 0.173 g | 0.346 g | 0.865 g | 1.384 g |
| % by weight | 0% | 0.1% | 0.2% | 0.5% | 0.8% |

The temperature stabilities of these various suspensions were tested and they are presented in table 8 below.

TABLE 8

Temperature stability of the reference
formulation with 1.2% filler and variable attapulgite

|  | 5° C. | 10° C. | 15° C. | 20° C. | 25° C. | 35° C. |
|---|---|---|---|---|---|---|
| Without attapulgite | | | | | | |
| Standing for 12 h | -1.00% | <0.1% | -5.50% | <0.1% | <0.1% | <0.1% |
| After returning to 20° C. | 4.44% | 2.00% | 0.10% | — | 0.10% | 0.10% |
| 0.1% attapulgite | | | | | | |
| Standing for 12 h | -1.00% | <0.1% | -1.83% | <0.1% | <0.1% | <0.1% |
| After returning to 20° C. | 2.82% | 1.83% | -2.65% | — | <0.1% | 0.10% |
| 0.2% attapulgite | | | | | | |
| Standing for 12 h | -1.00% | <0.1% | 0.2% | <0.1% | <0.1% | <0.1% |
| After returning to 20° C. | -1.3% | 0.2% | 0.32% | — | <0.1% | 0.10% |
| 0.5% attapulgite | | | | | | |
| Standing for 12 h | <0.1% | <0.1% | <0.1% | <0.1% | -0.5% | -1.2% |
| After returning to 20° C. | <0.1% | <0.1% | <0.1% | — | -0.2% | -0.9% |
| 0.8% attapulgite | | | | | | |
| Standing for 12 h | 0.91% | 0.25% | <0.1% | <0.1% | -0.7% | -1.3% |
| After returning to 20° C. | 0.65% | <0.1% | <0.1% | — | -0.25% | -0.7% |

The temperature stability results are markedly improved in the presence of attapulgite and more particularly from a content by weight of attapulgite in the aqueous suspension of 0.2%.

Example 5

Comparative

Under the same operating conditions, if an attapulgite concentration of 0.5% is maintained and if the filler is omitted, the stability results are very mediocre. Significant creaming, representing 6% of the height of the sample, is observed at 24 hours (see table 9).

This confirms that the combination of filler and attapulgite is essential; the combined presence of attapulgite and filler confers a synergy in the temperature stability of the aqueous polysaccharide suspension.

TABLE 9

Reference formulation with attapulgite and without filler

| Component | Weight, g (%) |
|---|---|
| K$_2$CO$_3$ | 32 g |
| Water | 100 g |
| Hydroxyethylcellulose | 37.23 g (22%) |
| Filler B | — |
| Attapulgite | 0.865 g (0.5%) |
| Stability at 24 h | 6% |

Example 6

Test with Various Polysaccharides

Various polysaccharides were tested, all at concentrations by weight of 22% in the aqueous suspension. They are:

Hydroxyethylcellulose (HEC): cellulose derivative (cellulose ether) prepared from a modified natural polysaccharide, the main chain of which is cellulose (β-D-glucose) etherified by means of a strong base and of ethylene oxide, in order to obtain hydroxyethylcellulose with a number of moles of substituent (MS) per β-D-glucose unit of 2.5 (sold under the name Natrosol GXR, exhibiting a degree of polymerization of approximately 1000).

Hydroxyethylcellulose having a high degree of polymerization (HEC (HDP)) (sold under the name Natrosol 250 HHXR): it is the same molecule as the hydroxyethylcellulose described above with a higher degree of polymerization of between 30 000 and 100 000 approximately.

Methylhydroxypropylcellulose (MHPC): this cellulose derivative exhibits two types of substituents at the OH groups of the cellulose, namely methoxyl (—O—CH$_3$) and hydroxypropyl (—O—CH$_2$—CH(OH)—CH$_3$) groups. The degree of substitution of the methoxyls is between 1.17 and 2.33 and the degree of substitution of the hydroxypropyls is between 0.05 and 0.8. The degree of polymerization of the cellulose unit is between 220 and 300, which confers, on the molecule, an average molar mass of between 40 000 and 50 000. This polysaccharide is sold under the name Culminal MHPC 500-PF.

Hydrophobic modified hydroxyethylcellulose (HMHEC): this cellulose derivative exhibits two types of substituents at the OH groups of the glucose molecule, namely hydroxyethyls (—O—CH$_2$—CH$_2$—OH) and alkyl groups with a number of carbons of between 8 and 25, and is sold under the name Nexton D2500W. The number of moles of substituents per β-D-glucoside unit is approximately 2.5.

Hydroxypropyl guar (HPG): this polysaccharide exhibits a main chain composed of a sequence of (β-1→4)-D-mannopyranose mannose residues with a (1→6) side group composed of a galactose residue (with a mannose/galactose ratio of between 1.5 and 2); some —OH groups of the natural molecule are replaced by hydroxypropyl groups (introduced by etherification). The molecule is sold by Lamberti under the name Esacol HS30.

Diutan gum: this polysaccharide of natural origin is unmodified and exhibits a main chain composed of the sequence of the →4)-L-rhamnopyranosyl-(α-1→3)-D-glucopyranosyl-(β-1→4)-D-glucuronopyranosyl-(β-1→4)-D-glucopyranosyl-(β→residues, with a side group of two rhamnopyranose residues (L-glucopyranosyl-(α-1→4)-L-glucopyranosyl-(α-1→3)) bonded to carbon 3 of the (β-1→4)-D-glucopyranosyl-(β-1→4) of the main chain. Its molecular weight is approximately 5 million. It is sold under the name Kelcocrete 200.

These polysaccharides were all tested under identical conditions, namely at 22% by weight in the aqueous suspension in the presence of 0.4% or 1.2% filler and 0.5% attapulgite (see table 10). All the suspensions including these polysaccharides exhibited advantageous performances with regard to the temperature stability (see the results combined in table 11).

TABLE 10

| Component | Weight (g) (%) | | | | | |
|---|---|---|---|---|---|---|
| $K_2CO_3$ | 32 | 32 | 32 | 32 | 32 | 32 |
| Water | 100 | 100 | 100 | 100 | 100 | 100 |
| Polysaccharide | HEC | HEC (HDP) | MHPC | HMHEC | HPG | Diutan gum |
| | 37.23 (22%) | 37.23 (22%) | 37.23 (22%) | 37.23 (22%) | 37.23 (22%) | 37.23 (22%) |
| Filler B | 0.686 (0.4%) | 2.059 (1.2%) | 0.686 (0.4%) | 0.686 (0.4%) | 0.686 (0.4%) | 0.686 (0.4%) |
| Attapulgite | 0.865 (0.5%) | 0.865 (0.5%) | 0.865 (0.5%) | 0.865 (0.5%) | 0.865 (0.5%) | 0.865 (0.5%) |
| Stability at 12 h | <0.1% | <0.05% | <0.1% | <0.1% | 2.08% | <0.1% |

Key:
HEC = hydroxyethylcellulose (Natrosol 250 GXR)
HEC (HDP) = hydroxyethylcellulose having a high degree of polymerization (Natrosol 250 HHXR)
MHPC = methylhydroxypropylcellulose (Culminal MHPC 500-PF)
HMHEC = hydrophobic modified hydroxyethylcellulose (Nexton D2500W)
HPG = hydroxypropyl guar (Esacol HS30)
Diutan gum = (Kelcocrete 200)

TABLE 11

Temperature stability of the suspensions of the various polysaccharides of table 10

| | | 5° C. | 10° C. | 15° C. | 20° C. | 25° C. | 35° C. |
|---|---|---|---|---|---|---|---|
| HEC (HDP) | Standing for 12 h | <0.1% | <0.1% | <0.1% | <0.1% | <0.1% | -0.13% |
| | After returning to 20° C. | <0.1% | <0.1% | <0.1% | — | <0.1% | -0.2% |
| MHPC | Standing for 12 h | <0.1% | <0.1% | <0.1% | <0.1% | <0.1% | <0.1% |
| | After returning to 20° C. | <0.1% | <0.1% | <0.1% | — | <0.1% | <0.1% |
| HMHEC | Standing for 12 h | <0.1% | <0.1% | <0.1% | <0.1% | <0.1% | <0.1% |
| | After returning to 20° C. | <0.1% | <0.1% | <0.1% | — | <0.1% | <0.1% |
| HPG | Standing for 12 h | <0.1% | <0.1% | <0.1% | <0.1% | 3.59% | — |
| | After returning to 20° C. | 4.35% | 3.38% | 1.96% | — | 2.40% | — |
| 22% Diutan gum | Standing for 12 h | <0.1% | <0.1% | <0.1% | <0.1% | <0.1% | <0.1% |
| | After returning to 20° C. | <0.1% | <0.1% | <0.1% | — | <0.1% | <0.1% |
| Comparative | | | | | | | |
| 2.2% Diutan gum | Standing for 12 h | -32.84% | -32.28% | 34.14% | -34.51% | -35.63% | — |
| | After returning to 20° C. | -30.60% | -30.04% | -30.70% | — | <0.1% | — |

By way of comparison, diutan gum was tested at a concentration divided by 10, namely at 2.2% by weight. All these suspensions exhibited separation on settling after standing for 12 hours at different temperatures.

Also by way of comparison, other polysaccharides comprising acyl groups on the glucoside chains, such as, for example, gellan gum (non-deacylated) or carboxymethylcellulose (CMC), were tested. Mixing these polysaccharides with the aqueous $K_2CO_3$ solution is impossible as the flocks develop very rapidly and result in a virtually solid pasty mixture.

Similar observations were made with xanthan gum, which also has acyl groups.

Example 7

Comparative

Bentonite was tested as replacement for attapulgite.

If the result obtained in example 3 under the same conditions is compared, bentonite does not make possible stability at 24 hours: a significant creaming phenomenon is observed and all the samples exhibit a phase separation with a negative value, that is to say a separation on settling, during the temperature stability tests (see table 13).

TABLE 12

Reference formulation with filler (1.2%) and bentonite (0.5%)

| Component | Weight, g (% by weight) |
|---|---|
| $K_2CO_3$ | 32 g |
| Water | 100 g |
| Hydroxyethylcellulose | 37.23 g (22%) |
| Filler B | 2.059 g (1.2%) |
| Bentonite | 0.865 g (0.5%) |
| Stability at 24 h | 9% |

TABLE 13

Temperature stability of the reference formulation with 1.2% filler and 0.5% bentonite

| | 5° C. | 10° C. | 15° C. | 20° C. | 25° C. | 35° C. |
|---|---|---|---|---|---|---|
| Standing for 12 h | <0.1% | -3.87% | -7.84% | -9% | — | -14.1% |
| After returning to 20° C. | -2.3% | -9.6% | -13.3% | — | — | -14.2% |

Example 8

Comparative

The tests with another clay, kaolinite, show an identical behavior to that observed with bentonite, with a worsening. The suspensions are very unstable; a separation on settling is noted at 24 hours and also during the various tests at different temperatures (see table 15).

TABLE 14

Reference formulation with filler (1.2%) and kaolinite (0.5%)

| Component | Weight, g (% by weight) |
|---|---|
| $K_2CO_3$ | 32 g |
| Water | 100 g |
| Hydroxyethylcellulose | 37.23 g (22%) |
| Filler B | 2.059 g (1.2%) |
| Kaolinite | 0.865 g (0.5%) |
| Stability at 24 h | -19.08% |

TABLE 15

Temperature stability of the reference formulation with 1.2% filler and 0.5% kaolinite

| | 5° C | 10° C | 15° C | 20° C | 25° C | 35° C |
|---|---|---|---|---|---|---|
| Standing for 12 h | -18.3% | -20.06% | -13.5% | -19.08% | — | -32.1% |
| After returning to 20°C | -15.0% | -26.2% | -19.5% | — | — | 28.1% |

Example 9

(Comparative): Absence of Salt

By way of comparison, aqueous suspensions of polysaccharides were tested in the absence of $K_2CO_3$ salt with the same polysaccharides and under the same conditions as for example 6. It proved impossible, for all the polysaccharides, to produce an aqueous suspension due to the formation, in all cases, of significant agglomerates.

Example 10

Viscosifying Agent for Cementitious Compositions

In some cases, it is desirable to increase the viscosity of cementitious compositions without detrimentally affecting the spreading thereof (which is a decreasing function of the yield point).

In the specific case of self-compacting concretes (SCCs), for which a minimum viscosity is necessary in order to provide the system with satisfactory cohesion during the emplacement thereof, viscosifying agents are introduced.

The stable aqueous polysaccharide suspension presented in the above examples was tested in comparison with a commercial viscosifying agent, in this instance the compound Rheomatrix 100 from BASF.

The aqueous polysaccharide suspension according to the invention which was employed here is that corresponding to example 3 and referred to hereinafter as RETEXP. The tests were carried out on a cement grout composed of:
  130 g of cement,
  78 g of water,
  0.65 g of superplasticizer (Cimfluid Adagio 4019), i.e. 0.5% by weight with respect to the cement.

The yield point and viscosity parameters, measured on cementitious compositions including variable proportions of viscosifying agent, are combined in table 16.

The viscosity and the yield point are measured with an AR1000 rotational rheometer from TA Instruments, equipped with a geometry of vane type, a decreasing succession of stress levels on a logarithmic scale (20 per decade) being applied. The viscosity and the yield point are deduced by modeling the curve obtained with the Herschel-Bulkley law.

TABLE 16

Measurement of yield point and viscosity

| Adjuvant | (% by weight of cement) | Yield point (Pa · s) | Viscosity (Pa · s) |
|---|---|---|---|
| Without adjuvant | | 0.5885 | 0.073 |
| Rheomatrix 100 | 0.2% | 1.85 | 0.093 |
| | 0.4% | 2.31 | 0.064 |
| | 0.6% | 3.167 | 0.02 |
| | 0.8% | 3.64 | 0.02 |
| | 1% | 9.93 | 1.2 (separation on settling) |
| RETEXP | 0.2% | 0.46 | 0.11 |
| | 0.4% | 0.41 | 0.12 |
| | 0.6% | 0.33 | 0.138 |
| | 0.8% | 0.32 | 0.15 |
| | 1% | 0.27 | 0.17 |

It is found that the product Rheomatrix 100 is provided rather as a "thresholding" agent (as defined in patent application FR 07/05568 of the same applicant).

The aqueous suspension according to the invention, RETEXP, brings about an increase in the viscosity of the cementitious composition without increasing the yield point, which is, on the contrary, reduced (which constitutes, on the contrary, an advantage).

This is confirmed by table 17, which measures the spreading immediately after the mixing of the mortar (measured according to the CEM* protocol developed by the CTG) of a mortar with the following composition:
- 680 g of cement,
- 1350 g of CEM* sand,
- 303 g of water,
- 8.16 g of superplasticizer (Cimfluid Adagio 4019), i.e. 1.2% of the weight of cement (*La méthode du mortier de béton équivalent (MBE). Un nouvel outil d'aide à la formulation des bétons adjuvantés [The concrete equivalent mortar (CEM) method. A new tool for helping in the formulation of adjuvant-comprising concretes]. A. Schwatzentruber and C. Catherine, Materials and Structures, vol. 33, October 2000, pp. 475-482)

Various adjuvants were tested, RETEXP and some components of this RETEXP aqueous suspension, namely HEC (hydroxyethylcellulose), the $K_2CO_3$ salt and attapulgite, in amounts equal to those of their presence in RETEXP.

TABLE 17

Measurement of the spreading

| Adjuvant | % | Spreading (mm) |
|---|---|---|
| None | — | 345 |
| RETEXP | 0.35 | 363 |
| HEC | 0.075 | 362 |
| $K_2CO_3$ | 0.065 | 340 |
| Attapulgite | 0.0018 | 345 |

$K_2CO_3$ alone and attapulgite alone do not affect the spreading. They are thus not the source of the properties observed; it is thus clearly the presence of the polysaccharide which makes possible the surprising slight increase in the spreading, despite the increase in the viscosity brought about by the addition of the polysaccharide.

Consequently, RETEXP can be easily used on site since it is a liquid aqueous suspension which can be easily introduced into the cementitious composition before or at the time of mixing.

The aqueous suspension according to the invention is thus entirely appropriate as viscosifying agent for cementitious compositions.

Example 11

Spreading and Viscosity of Self-Compacting Concrete

It has also been found that the aqueous suspension according to the invention RETEXP makes it possible to confer, on a cementitious composition of self-compacting concrete type, adequate properties both of spreading but also of viscosity and of passing ability, as well as of resistance to segregation.

To this end, a concrete composition as presented in table 17 was employed with different adjuvants:
- either no adjuvant: reference concrete with filler,
- or in the presence both of a viscosifying agent and of a thresholding agent, that is to say a concrete without filler (column 2), in accordance with the patent application FR 07/05568 of the same applicant,
- or with a concrete without filler with a reduced volume of grout with only just a viscosifying agent,
- or a concrete without filler with only the liquid adjuvant RETEXP (right-hand column) according to the present invention, with in addition a reduced volume of cement grout.

The following parameters were measured:
- the spreading according to the standard NF EN 12350-2 at different time intervals counting
- the V-funnel test at $t_0$ and $t_{60\ min}$, which makes it possible both to test the viscosity and the filling ability of a self-compacting concrete. A V-shaped funnel is filled with fresh concrete and the time (in seconds) necessary for the concrete to flow out of this funnel is measured. The value obtained measures the flow time of the V-funnel. This test is described in detail in the document *The European Guidelines for Self Compacting Concrete* (May 2005, Self Compacting Concrete European Project Group—S.C.C.E.P.G.);
- the L-box test (described in the same document), which consists in allowing a measured volume of fresh concrete to flow horizontally through spaces made between vertical bars. The concrete is introduced into the vertical part of the L-shaped box and flows into the horizontal part, and the height flowed in this part at the end of the horizontal branch of the L of the box is measured. The measurement presented in table 18 expresses the passing ability and is equal to the ratio of the height of the concrete at the end of the horizontal part of the box to the height of the concrete remaining in the vertical portion of the box;
- the sieve stability (measurement method presented in the same document); the result indicates the percentage of concrete passing through a sieve during a given time;
- the compressive strength (CS) is measured at 7 days and at 28 days.

TABLE 18

| Constituents (kg/m³) (% weight/cement) | Reference concrete with filler | Concrete without filler $V_g = 370\ l$ | Concrete without filler at $V_g = 350\ l$ | Concrete without filler at $V_g = 350\ l$ liquid adjuvant |
|---|---|---|---|---|
| Cement | 320 | 372 | 350 | 350 |
| Effective water | 200 | 227 | 213 | 213 |
| Filler | 110 | 0 | 0 | 0 |
| Sand (0/4 mm) | 876 | 876 | 904 | 904 |
| Gravel (4/14 mm) | 709 | 709 | 732 | 732 |

TABLE 18-continued

| Constituents (kg/m³) (% weight/cement) | Reference concrete with filler | Concrete without filler $V_g = 370$ l | Concrete without filler at $V_g = 350$ l | Concrete without filler at $V_g = 350$ l liquid adjuvant |
|---|---|---|---|---|
| Superplasticizer | 3.13 (0.95%) | 2.70 (0.73%) | 3.01 (0.86%) | 3.01 (0.86%) |
| "Viscosifying" agent* | 0 | 0.84 (0.225%) | 0.63 (0.18%) | 3.15 (liq.) 0.9% |
| "Thresholding" agent** | 0 | 0.093 (0.025%) | | |
| Volume of grout | 370 l | 370 l | 350 l | 350 l |
| Spreading | | | | |
| At $t_0$ | 665 mm | 665 mm | 610 mm | 600 mm |
| At $t_{30\,min}$ | 650 mm | 650 mm | 670 mm | 680 mm |
| At $t_{45\,min}$ | 605 mm | — | — | — |
| At $t_{60\,min}$ | 595 mm | 690 mm | 680 mm | 660 mm |
| At $t_{90\,min}$ | — | 685 mm | 660 mm | 650 mm |
| At $t_{120\,min}$ | 410 mm | 680 mm | 630 mm | 600 mm |
| V-funnel at $t_0$ | 3.6 s | 2.8 s | 2.6 s | 3.2 s |
| V-funnel at $t_{60\,min}$ | — | — | 3.3 s ($t_{120}$) | 2.9 s |
| L-box | 0.9 | 0.89 | 0.9 | 0.89 |
| Sieve stability | 17% | 16% | 6% | 8% |
| Compressive strength | | | | |
| 7 days | 34.5 MPa | 22.3 MPa | 24.3 MPa | 30.5 MPa |
| 28 days | 41.2 MPa | 33.5 MPa | 35.8 MPa | 36.7 MPa |

*The "viscosifying" agent is Natrosol 250 GXR (HEC)
**The "thresholding" agent is Esacol MX 144 (hydroxypropyl guar)

The results presented in table 18 show that the self-compacting concrete formulation with the RETEXP adjuvant exhibits, with a reduced volume of grout, better spreading from t=30 min up to t=120 min and a better sieve stability, with respect to the formulation with 110 kg/m³ of filler which exhibits a "supercompressive strength" at 28 days.

The invention claimed is:

1. A cementitious composition based on cement and water, comprising, as viscosifying agent, a liquid aqueous polysaccharide suspension in a content of between 0.1 and 5% by weight of cement,
wherein said liquid aqueous polysaccharide suspension comprises:
a concentration by weight of at least one polysaccharide of between 15 and 35% in the form of partially hydrated particles dispersed in an aqueous solution of a strong base salt, with the exception of ammonium salts, having an ionic strength of between 1.25 mol/l and 15 mol/l, exhibiting a pH of greater than 9, and
an attapulgite in the micronized form and at least one nonphyllitic mineral powder as a filler, chemically inert in said liquid aqueous polysaccharide suspension, with a particle size of between 0.1 and 100 micrometers, conferring on said liquid aqueous polysaccharide suspension a stability at least in a temperature range extending from 5 to 30° C.

2. The cementitious composition as claimed in claim 1, wherein the content by weight of attapulgite is between 0.1% and 5% in said liquid aqueous polysaccharide suspension.

3. The cementitious composition as claimed in claim 1, wherein the aqueous solution exhibits an ionic strength of between 2.5 mol/l and 12.5 mol/l.

4. The cementitious composition as claimed in claim 1, wherein the filler is a siliceous filler with a density of between 2.60 and 2.80 g/ml.

5. The cementitious composition as claimed in claim 1, wherein the filler exhibits a particle size curve for which the D50 value is between 1 and 12 micrometers.

6. The cementitious composition as claimed in claim 1, wherein the content by weight of filler is between 0.1 and 5% of said liquid aqueous polysaccharide suspension.

7. The cementitious composition as claimed in claim 1, wherein the concentration by weight of polysaccharide(s) is between 18 and 25% of said liquid aqueous polysaccharide suspension.

8. The cementitious composition as claimed in claim 1, wherein the polysaccharide exhibits, dry, a particle size curve for which the D50 value is between 10 and 200 μm.

9. The cementitious composition as claimed in claim 1, wherein the polysaccharide is selected from the group consisting of a hydroxyalkylcellulose or a hydroxyalkyl guar comprising a $C_2$ to $C_8$ alkyl group, a diutan gum and mixtures thereof.

10. The cementitious composition as claimed in claim 9, wherein the hydroxyalkylcellulose is selected from the group consisting of a hydroxyethylcellulose (HEC), a methylhydroxypropyl cellulose (MHPC), a hydrophobic modified hydroxyethylcellulose (HMHEC) and mixtures thereof.

* * * * *